United States Patent [19]
Johnson

[11] Patent Number: 5,748,974
[45] Date of Patent: May 5, 1998

[54] MULTIMODAL NATURAL LANGUAGE INTERFACE FOR CROSS-APPLICATION TASKS

[75] Inventor: David Edward Johnson, Peekskill, N.Y.

[73] Assignee: International Business Machines Corporation, Armonk, N.Y.

[21] Appl. No.: 354,987

[22] Filed: Dec. 13, 1994

[51] Int. Cl.$^6$ ................................................ G06F 9/45
[52] U.S. Cl. ................................ 395/759; 395/700
[58] Field of Search .................. 364/419.08, 419.01, 364/419.02, 419.03, 419.04; 395/155, 156, 161, 375, 934, 700, 759

[56] References Cited

U.S. PATENT DOCUMENTS

| | | | |
|---|---|---|---|
| 4,736,296 | 4/1988 | Katayama | 364/419 |
| 5,252,951 | 10/1993 | Tennenbaum | 345/156 |
| 5,282,265 | 1/1994 | Rohra Suda | 364/419.08 |
| 5,301,326 | 4/1994 | Linnett | 395/700 |
| 5,321,608 | 6/1994 | Namba | 364/419.08 |
| 5,377,103 | 12/1994 | Lamberti | 364/419.08 |
| 5,390,281 | 2/1995 | Luciw | 364/419.08 |
| 5,442,780 | 8/1995 | Tanashi | 364/419.08 |

*Primary Examiner*—Jeffery Hofsass
*Assistant Examiner*—Albert K. Wong

*Attorney, Agent, or Firm*—Whitham, Curtis, Whitham & McGinn; Stephen J. Kaufman

[57] ABSTRACT

A multimodal natural language interface interprets user requests combining natural language input from the user with information selected from a current application and sends the request in the proper form to an appropriate auxiliary application for processing. The multimodal natural language interface enables users to combine natural language (spoken, typed or handwritten) input selected by any standard means from an application the user is running (the current application) to perform a task in another application (the auxiliary application) without either leaving the current application, opening new windows, etc., or determining in advance of running the current application what actions are to be done in the auxiliary application. The multimodal natural language interface carries out the following functions: (1) parsing of the combined multimodal input; (2) semantic interpretation (i.e., determination of the request implicit in the pars); (3) dialog providing feedback to the user indicating the systems understanding of the input and interacting with the user to clarify the request (e.g., missing information and ambiguities); (4) determination of which application should process the request and application program interface (API) code generation; and (5) presentation of a response as may be applicable. Functions (1) to (3) are carried out by the natural language processor, function (4) is carried out by the application manager, and function (5) is carried out by the response generator.

8 Claims, 7 Drawing Sheets

| App: Con | A1 ... | Ai ... | Ar |
|---|---|---|---|
| ⋮ | | | |
| Person | | √ | √ |
| ⋮ | | | |
| Phone | √ | √ | |
| Fax ⋮ | | √ | √ |

FIG.6A

MULTIMODAL NATURAL LANGUAGE INTERFACE FOR CROSS-APPLICATION TASKS

BACKGROUND OF THE INVENTION

1. Field of the Invention

The present invention generally relates to user interfaces for computer systems and, more particularly, to a multimodal natural language interface that allows users of computer systems conversational and intuitive access to multiple applications. The term "multimodal" refers to combining in put from various modalities; e.g., combining spoken, typed or handwritten input from the user.

2. Description of the Prior Art

Since the introduction of the personal computer, it has been a goal to make using such a computer easier. This goal recognizes that greater numbers of people are using computers in their daily lives and business and that the majority of the people using computers have little training in their use. The term "user friendly" was coined to describe applications running on computers which required minimal training for a user to be able to effectively use those applications and become productive. In a business context, training employees in the use of a computer can be a very expensive overhead cost to the business.

The graphic user interface (GUI) was introduced by the Xerox Palo Alto Research Center (PARC) and made popular by the Apply Macintosh computers. The GUI is often described as a "point-and-click" interface because a cursor pointing device, such as a mouse, trackball or the like, is used to move a cursor on the display to an icon or command bar where the user simply "clicks" or, in some cases, double "clicks" a mouse button, for example. This is in contrast to typing in carefully composed commands, a process which is anything but intuitive. The GUI is now the de facto standard in such operating systems and International Business Machines (IBM) Corporation's OS/2 operating system and the forthcoming Mircosoft Windows 95 operating system.

While the GUI has been a major improvement in computer interfaces, the effective use of applications running under operating systems supporting a GUI still requires a knowledge of procedures to effectively use applications running on those operating systems. For example, users running an application (current application) frequently want to perform some unanticipated task in another application (auxiliary application) based in part on information in the current application. Currently, performing such tasks is time-consuming and cumbersome, requiring the user to determine what auxiliary application needs to be accessed, open a new window, import information from the current application, and other related tasks. Thus, as important as the GUI has been in making computer systems "user friendly", there still remains much improvement to be made to facilitate use of computers by an increasingly large number people.

SUMMARY OF THE INVENTION

It is therefore an object of the present invention to provide a multimodal natural language interface that interprets requests combining natural language input from the user with information selected from the current application and sends the request in the proper form to the appropriate application for processing.

According to the invention, there is provided a multimodal natural language interface that enables users to combine natural language (spoken, typed or handwritten) input selected by any standard means from an application the user is running (the current application) to perform a task in another application (the auxiliary application) without either leaving the current application, opening new windows, etc., or determining in advance of running the current application what actions are to be done in the auxiliary application.

The invention carries out the following functions: (1) parsing of the combined multimodal input; (2) semantic interpretation (i.e., determination of the request implicit in the parse); (3) dialog providing feedback to the user indicating the systems understanding of the input and interacting with the user to clarify the request (e.g., missing information and ambiguities); (4) determination of which application should process the request and application program interface (API) code generation; and (5) presentation of a response as may be applicable. Functions (1) to (3) are carried out by the natural language processor, function (4) is carried out by the application manager, and function (5) is carried out by the response generator.

The invention allows the use of multimodal (spoken, typed, handwritten) natural language input supplied by the user combined with information selected from a current application via any standard technique. The invention further provides a unique combination and application of techniques from artificial intelligence and computational linguistics that have been used in other applications, e.g., natural language database query and machine translation, in the area of user interfaces supporting cross-application tasks. Together, these go beyond current state-of-the-art user interfaces supporting cross-application tasks.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
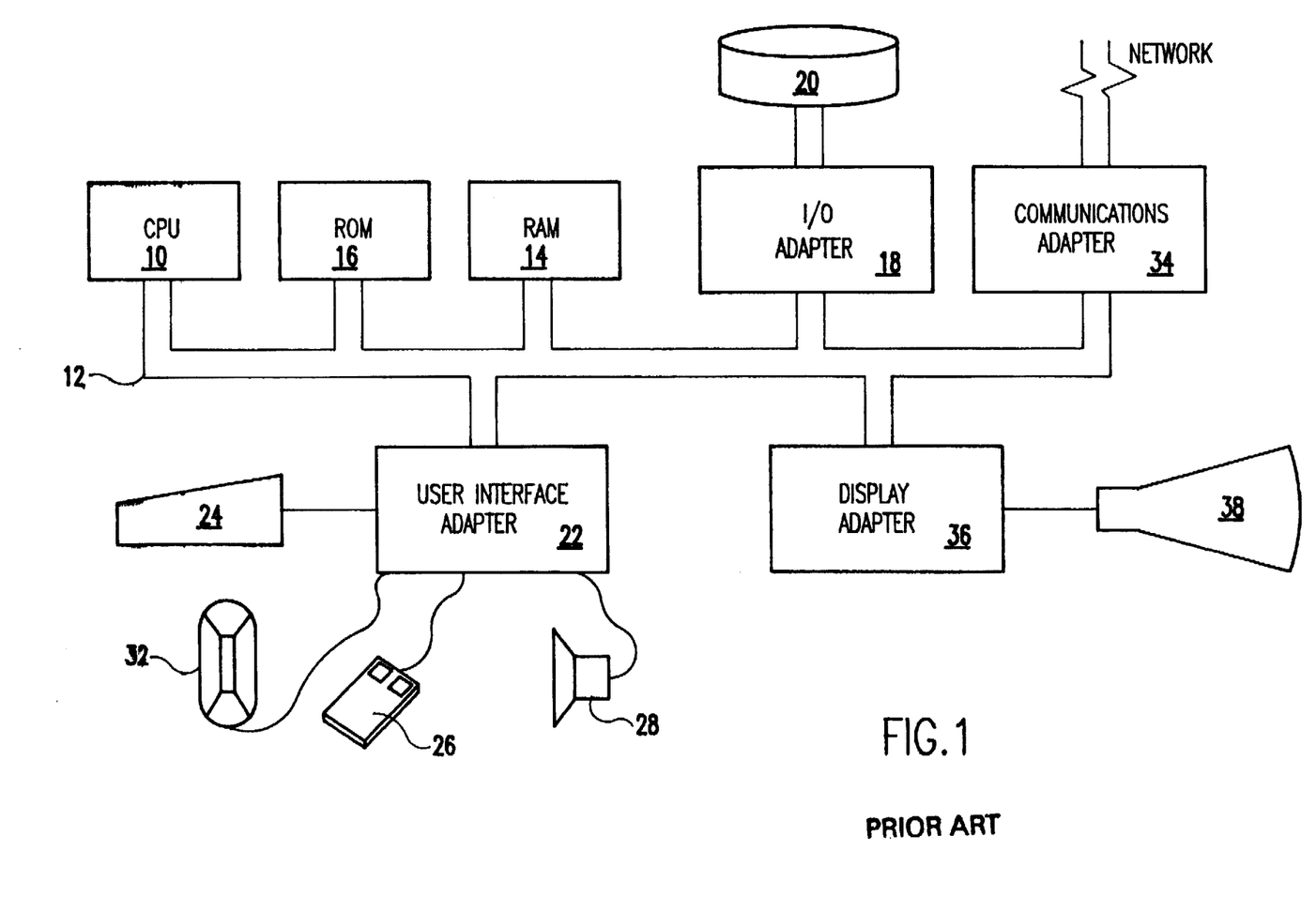
FIG. 1 is a block diagram showing a hardware configuration on which the subject invention may be implemented.

Referring now to the drawings, and more particularly to FIG. 1, there is shown a representative hardware environment on which the subject invention may be implemented. This hardware environment may be a personal computer, such as the IBM's PS/2 family of Personal Computers, running an operating system capable of supporting multitasking, such as IBM's OS/2 operating system. The hardware includes a central processing unit (CPU) 10, which may conform to Intel's X86 architecture or may be a reduced instruction set computer (RISC) microprocessor such as IBM's PowerPC® microprocessor. The CPU 10 is attached to a system bus 12 to which are attached a read/write or random access memory (RAM) 14, a read only memory (ROM) 16, an input/output (I/O) adapter 18, and a user interface adapter 22. The RAM 14 provides temporary storage for application program code and data, while ROM 16 typically includes the basic input/output system (BIOS) code. The I/O adapter 18 is connected to one or more Direct Access Storage Devices (DASDs), here represented as a disk drive 20. The disk drive 20 typically stores the computer's operating system (OS) and various application programs, each of which are selectively loaded into RAM 14 via the system bus 12. The user interface adapter 22 has attached to it a keyboard 24, a mouse 26, a speaker 28, a microphone 32, and/or other user interface devices (not shown). The personal computer also includes a display 38, here represented as a cathode ray tube (CRT) display but which may be a liquid crystal display (LCD) or other suitable display. The display 38 is connected to the system bus 12 via a display adapter 34. Optionally, a communications adapter 34 is connected to the bus 12 and to a network, for example a local area network (LAN), such as IBM's Token Ring LAN. Alternatively, the communications adapter may be a modem connecting the personal computer or workstation to a telephone line as part of a wide area network (WAN).

The preferred embodiment of the invention is implemented on a hardware platform as generally shown in FIG. 1. The architecture of the multimodal natural language interface according to the invention will now be described followed by specific examples of its operation. The multimodal natural language interface is linked to applications permitting users, from within a current application, to perform actions in an auxiliary application without the necessity of opening new windows or similar procedures. The term "multimodal" refers to the feature of combining input from various modalities; e.g., combining spoken, typed, or handwritten input from the user with input selected from an application the user is running by any standard means, including point-and-click, touch, and keyboard selection.

Figure 2:
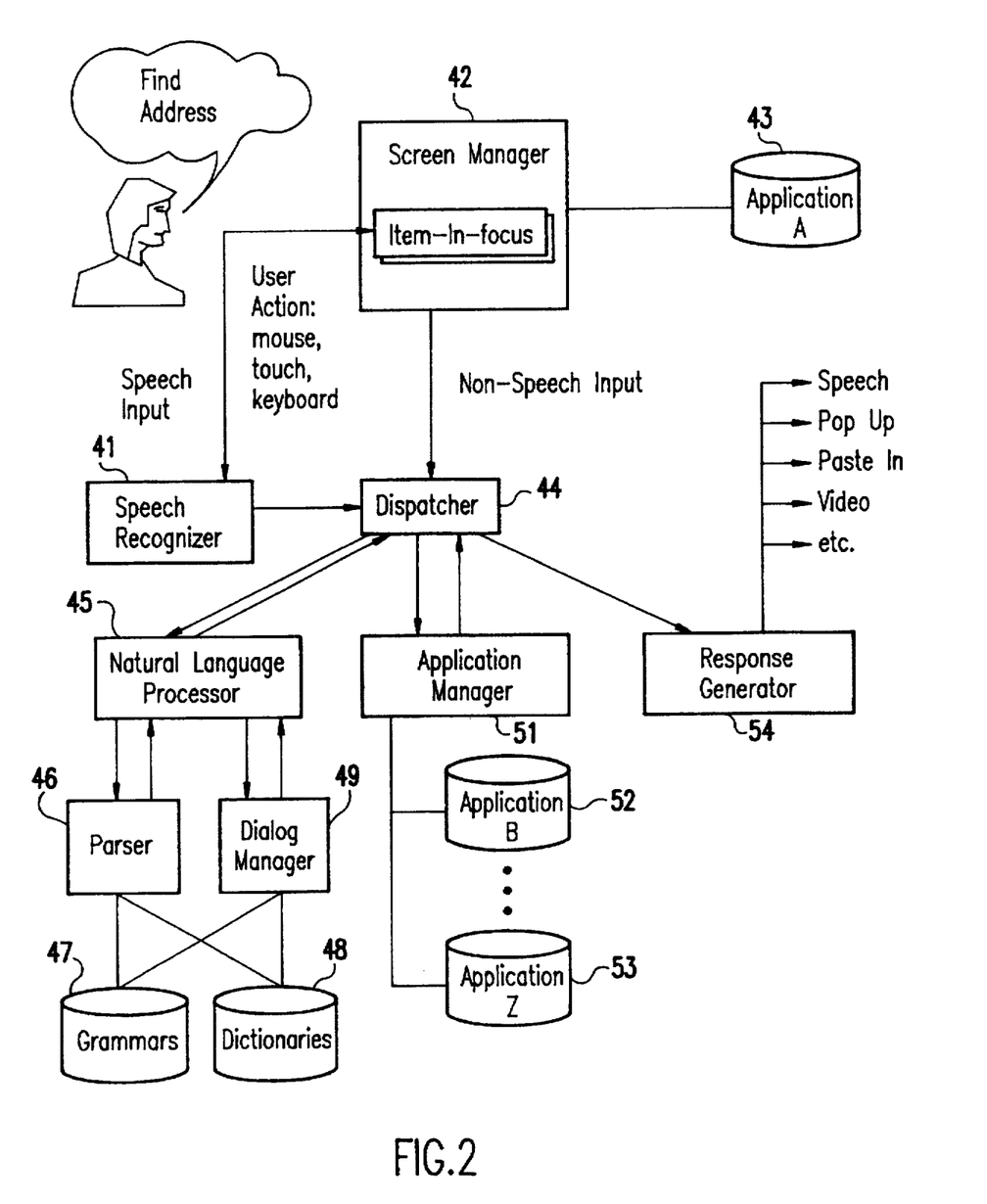
FIG. 2 is a block diagram of the multimodal system architecture according to the present invention.

With reference now to FIG. 2 there is shown the basic architecture of the system. The user input may be spoken, typed, handwritten, mouse controlled cursor, touch, or any other modality. In the illustrated example, speech is input via microphone 32 (FIG. 1). The speech input, "Find address", is supplied to a speech recognizer 41 which generates an output. At the same time, the user may also provide non-speech input; e.g., by keyboard 24, mouse 26, a touch screen (not shown) attached to display 38, or the like. As mentioned the multimodal input contemplates handwritten input as well, and this may be accommodated by means of a stylus and tablet (not shown) or the mouse 26. This non-speech input is received by the screen manager 42, such as the Presentation Manager (PM) of the OS/2 operating system. The screen manager 42 also provides the a display window for application A, the current application, here shown as being accessed from a direct access storage device (DASD) 43, such as the hard disk 20 (FIG. 1). Within the window for application A, there is an "Item-in-Focus", such as text or a graphic.

The output of the speech recognizer 41 and the non-speech input received by the screen manager 42 are sent to a dispatcher 44 which combines the inputs and directs the combined input to first of all a natural language processor 45. The natural language processor 45 directs the combined multimodal input to a parser/semantic interpreter 46 which accesses grammars and dictionaries on DASDs 47 and 48, which may be the same or different hard disk 20 (FIG. 1) on which application A resides. The parsed input is subjected to further semantic interpretation by the dialog manager 49, again with the aid of the grammars and dictionaries on DASDs 47 and 48. The natural language processor 45 provides feedback to the user via the dispatcher 44 to indicate the system's understanding of the input. If necessary, the natural language processor 45 interacts with the user to clarify any missing information or ambiguities in the request. The techniques employed by the natural language processor 45, parser 46 an dialog manager 49 are common in the area of natural language query database systems. Examples of commercially available natural language query database systems are IBM's "LanguageAccess" and NRI's "Natural Language" products.

Based on the output of the natural language processor 45, the dispatcher 44 invokes the application manager 51 to determine which application should process the request. Note that in the prior art the application manager of the operating system would have to be invoked by the user to first open a window for a selected application and then the application would have to be started and run in that window. The user would then have to access the requested information and then, using a clipboard function, copy and paste the information into the original application window. According to the invention, this is all done automatically without any intervention by the user. For example, the application manager 51 may access any of applications B to Z on DASDs 52 to 53, again which may be the same or different hard disk 20 (FIG. 1) on which application A resides. The application accessed is the auxiliary application. The application manager 51 determines which of applications B to Z has the requested information. The application manager 51 may determine that a database program, say application B, contains an address file where the requested information resides. The application manager 51 sends semantic representation of the request to the API code generator for application B which, in turn, generates the application program interface (API) code required to access the requested information. This is done without opening a window. The auxiliary application (e.g., the database program) is opened in the background and the API code (e.g., query) is generated to retrieve the requested information. Once the information has been accessed by the application manager 51, the requested information is supplied to the dispatcher 44 which then dispatches the information to the response generator 54. The response generator 54 then generates a response appropriate to the nature of the request and the current application. This response can be speech, from a synthesizer (not shown), text in a pop up window, text or a graphic which is pasted into the current application, a video clip, or the like.

Figure 3:
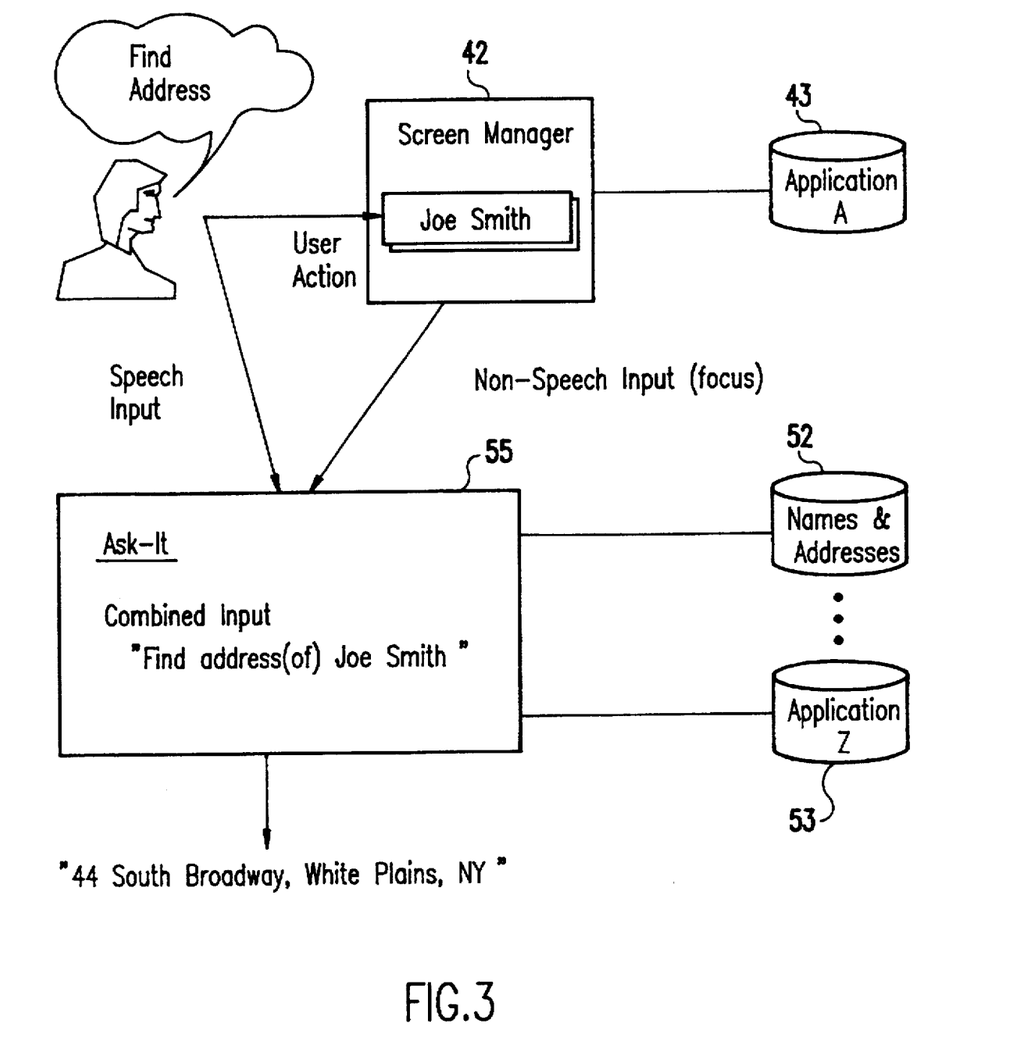
FIG. 3 is a block diagram of a first example of the operation of the multimodal system shown in FIG. 2.

Consider now a specific example with reference to FIG. 3. If the current application (application A) is a word processor and the user is writing a letter to Joe Smith, after typing John Smith's name via keyboard 24, the user may provide the speech input, "Find address". The combined multimodal input, the typed name of Joe Smith ("Item-in-Focus" in FIG. 1) and the spoken request "Find address", is processed by the natural language processor 45 and supplied by the dispatcher 44 to the application manager 51, here represented by the "Ask-It" block 55. In the example described, the combined input is "Find address (of) Joe Smith". The function performed is to access a names and addresses file 56 via a database program on DASD 52 and retrieve Joe Smith's address. The appropriate response is to paste the retrieved address of Joe Smith in the letter being written by the word processor application (application A).

Figure 4:
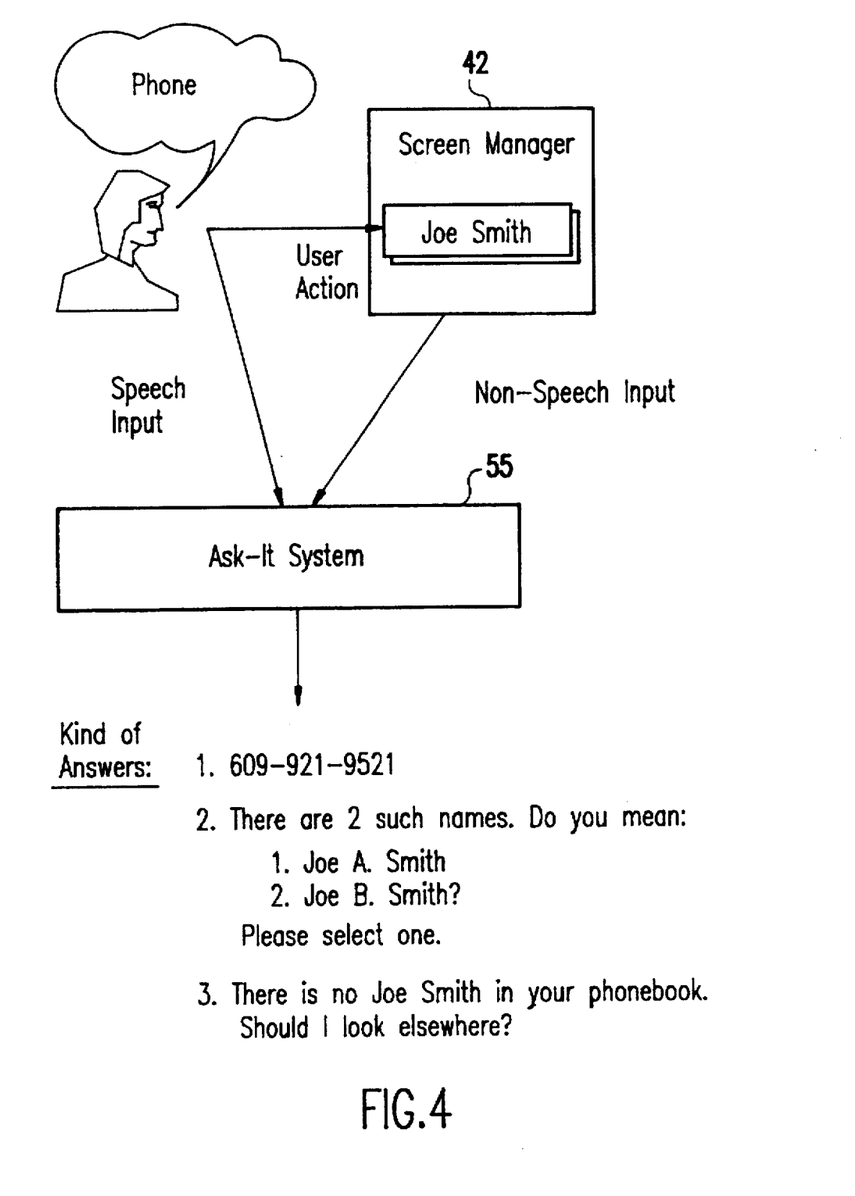
FIG. 4 is a block diagram of a second example of the operation of the multimodal system shown in FIG. 2.

Consider next the example shown in FIG. 4. The user has typed in Joe Smith's name, but now instead of requesting an address, the user provides the speech input "Phone". There are several possible answers illustrated in the example of FIG. 4. The first is to retrieve Joe Smith's telephone number. However, if there are two Joe Smiths in the database, then there is an ambiguity that must be clarified before a final response can be generated. The dialog manager 49 (FIG. 2) will provide a choice to the user, perhaps in a pop-up window, and request the user to select one of the choices. On the other hand, there may be no Joe Smith listed in the phonebook, in which case there is not enough information in the request to process it. The dialog manager 49 would then inform the user that there is no Joe Smith listed and ask for more information, such as "Should I look elsewhere". This response could be a text display in a pop up window, for example, or synthesized speech. Ultimately, when the telephone number is located, the response could be either a listing of the number itself or the number would be dialed via the communications adapter 34 (FIG. 1).

Figure 5:
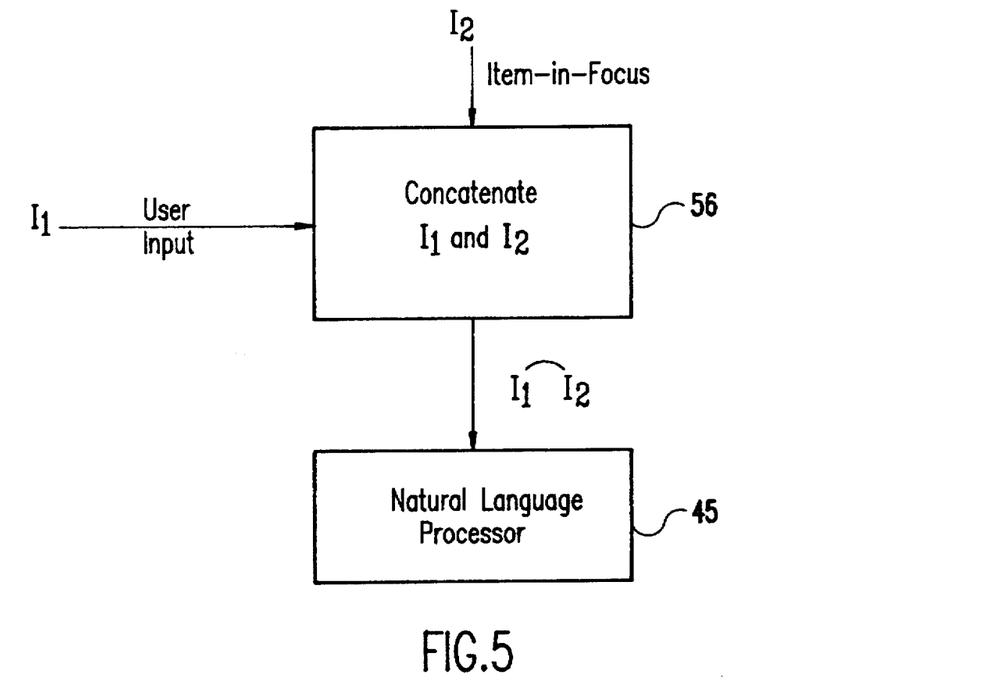
FIG. 5 is a flow diagram showing the logic of the combining multimodal linguistic input function of the dispatcher.

The functions which support the multimodal natural language interface are the dispatcher 44 and the application manager 51 shown in FIG. 2. With reference now to FIG. 5, the dispatcher function is illustrated by way of a flow diagram. The user input, I1, and the item-in-focus input, I2, from the current application are simply concatenated in function block 56 as "user input"+"item-in-focus". The grammar and semantic interpretation rules used in the natural language processor 45 insure the intended meaning is recovered. As mentioned, various state of the art natural language processing systems can be used to perform the function of the natural language processor 45. Even if the concatenated input to the natural language processor 45 does not match the natural order of the natural language processed, the natural language processor will still recover the intended meaning. For example, if the concatenated input were "send to Mary"+<filename>, meaning "send to Mary financial data", the natural language processor 45 would understand this by the correct English expression "send <filename> to Mary", meaning "send financial data to Mary" since the natural language processor can analyze unusual word orders by supplying the appropriate grammatical rules. A significant ease of use advantage of this system is that the user input and the input supplied from the current application can be input in either temporal order or even overlap in time.

Figure 5A:
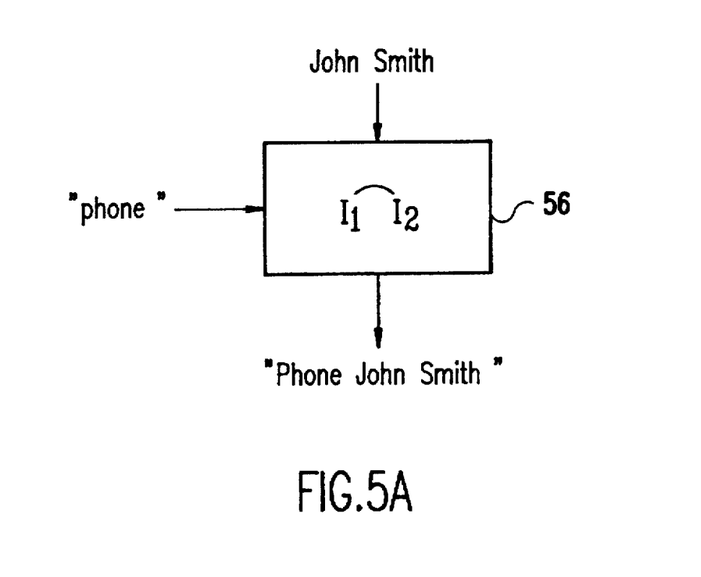
FIG. 5A is an example of the combining multimodal linguistic input function of the dispatcher.

FIG. 5A provides another example of the operation of the dispatcher function 56. In this case, the user input is "phone" and the application input is "John Smith". The dispatcher concatenation function is to output "phone John Smith" to the natural language processor.

Figure 6:
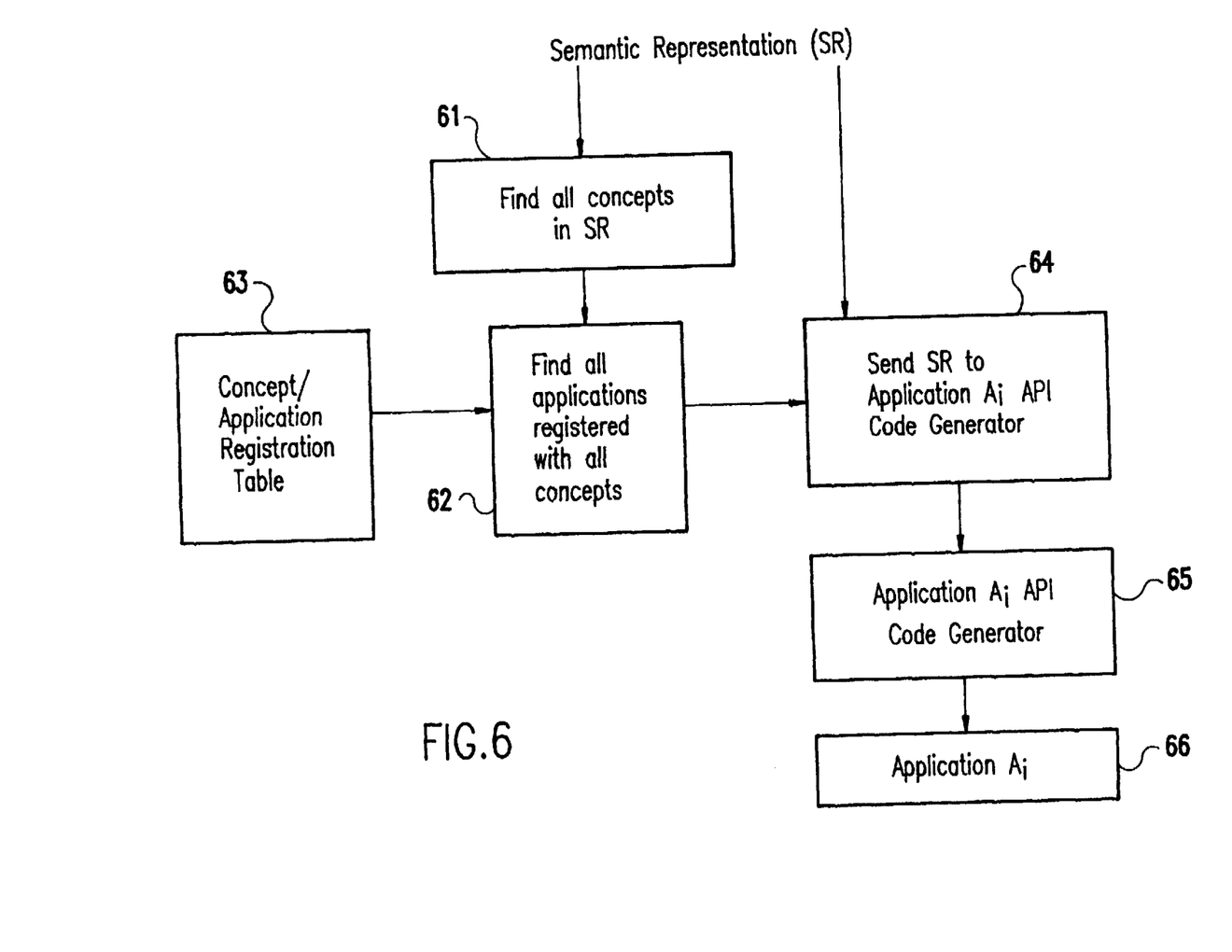
FIG. 6 is a flow diagram showing the logic of the application manager.
Figure 6A:
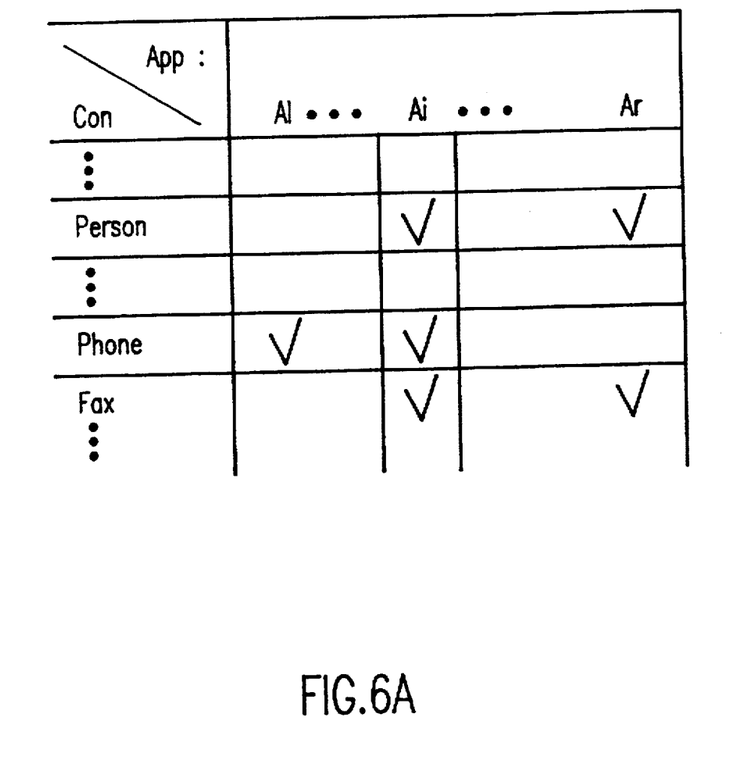
FIG. 6A is an example of a concept/application registration table used by the application manager.

The flow diagram of the application manager 51 is shown in FIG. 6, to which reference is now made. For a given input, the application manager first finds all concepts in the semantic representation provided by the natural language processor 45 in function block 61 and then, in function block 62, determines from the semantic representation each application that is registered with every concept in the semantic representation. This determination is made by referencing a concept/application table 63. Some concepts might be stipulated to be application independent, and those would not need to be considered. Such concepts could be identified by a flag set in a dictionary. Each application-specific concept is listed along with the names of the applications registered with that concept in the concept/application registration table 63. This is logically just a table where, without loss of generality, the columns are labeled with application names and the rows with concept names. An example is shown in FIG. 6A. Once the set of application-specific concepts is determined, each such concept is looked up in the concept/application registration table, and the associated set of registered application names is returned. Each concept thus results in a set of application names being produced, which may be referred to as a "Concept-Application Set". After each concept has been processed, the result is a collection of Concept-Application Sets, one set of application names for each application-specific concept looked up in the concept/application registration table 63. The name of each application that occurs in every Concept-Application Set derived from the input semantic representation is determined. Logically, this can be done by simple set intersection. The result is a set of application names (Application Set), all of which are registered with each application-specific concept derived from the semantic representation of the input.

Next, in function block 64, the application manager sends the semantic representation to the API code generator 65 of each such application. Typically, there will be only one, but nothing precludes more than one application name occurring in the Application Set. In such a case, the input is truly ambiguous and the system could either report this to the user via the dispatcher or simply submit the semantic representation to each of the named application API code generators or both. Nothing in the architecture hinges on this choice and parameter could be set to determine the actual behavior of the system in particular circumstances. It is also possible that the Application Set is empty, corresponding to an input that was not meaningful with respect to the applications registered with the system in the concept/application registration table 63. This event would be reported back to the dispatcher for further processing, e.g., interaction with the user to determine the next action, if any. Assuming that an application is found and the semantic representation is sent to that application's API code generator in function block 65, the application then acts on the code in function block 66 to retrieve the data requested.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A multimodal natural language interface for a computer system which interprets user requests combining natural language input from the user with information selected from a current application running on the computer system and sends the request in proper form to an appropriate auxiliary application for processing, the multimodal natural language interface comprising:

a dispatcher receiving a natural language input from the user and combining the natural language input with input information selected from a current application to form a combined multimodal request;

a parser receiving the combined multimodal request for parsing the combined multimodal request;

a natural language processor performing semantic interpretation of the parsed combined multimodal request and generating a semantic representation of the combined multimodal request;

an application manager receiving the semantic representation from the natural language processor for determining which auxiliary application should process the request, said application manager invoking the auxiliary application and generating application program interface (API) code to access requested information via the auxiliary application, the accessed requested information being supplied to said dispatcher; and a response generator receiving the accessed requested information from the dispatcher for generating a response as may be applicable to the user's request.

2. The multimodal natural language interface recited in claim 1 further comprising a dialog manager providing feedback to the user indicating the system's understanding of the input and interacting with the user to clarify the request, if necessary.

3. The multimodal natural language interface recited in claim 2 wherein said dispatcher forms the combined multimodal request by concatenating the user natural language input with the input information selected from the current application running on the system.

4. The multimodal natural language interface recited in claim 3 wherein the application manager includes a concept/application registration table, said application manager finding all concepts in the semantic representation from the natural language processor and then finding all applications registered in said concept/application registration table for those concepts.

5. A method implemented in a computer system for interpreting user requests by combining natural language input from a user with information selected from a current application running on the computer system comprising the steps of:

receiving a natural language input from the user and combining the natural language input with input information selected from a current application to for a combined multimodal request;

parsing the combined multimodal request;

performing semantic interpretation of the parsed combined multimodal request to generate a semantic representation of the combined multimodal request;

determining of which auxiliary application should process the request;

invoking the auxiliary application and generating application program interface (API) code to access requested information via the auxiliary application; and receiving the accessed requested information and generating a response as may be applicable to the user's request.

6. The method recited in claim 5 further comprising the step of providing feedback to the user indicating the system's understanding of the input and interacting with the user to clarify the request, if necessary.

7. The method recited in claim 6 wherein the step of combining is performed by concatenating the user natural language input with the input information selected from the current application running on the system.

8. The method recited in claim 7 further comprising the steps of:

generating a concept/application registration table;

finding all concepts in the semantic representation; and then finding all applications registered in said concept/application registration table for those concepts.

\* \* \* \* \*